United States Patent
Milman et al.

(10) Patent No.: US 11,361,039 B2
(45) Date of Patent: Jun. 14, 2022

(54) AUTODIDACTIC PHENOLOGICAL DATA COLLECTION AND VERIFICATION

(71) Applicant: INTERNATIONAL BUSINESS MACHINES CORPORATION, Armonk, NY (US)

(72) Inventors: Ivan M. Milman, Austin, TX (US); Fang Wang, Westford, MA (US); Su Liu, Austin, TX (US); Jeffrey A. Calcaterra, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 16/102,167

(22) Filed: Aug. 13, 2018

(65) Prior Publication Data
US 2020/0050706 A1 Feb. 13, 2020

(51) Int. Cl.
G06F 16/00 (2019.01)
G06F 16/9535 (2019.01)
(Continued)

(52) U.S. Cl.
CPC ...... *G06F 16/9535* (2019.01); *G06F 16/5854* (2019.01); *G06F 16/907* (2019.01); *G06V 20/188* (2022.01); *G09B 19/00* (2013.01)

(58) Field of Classification Search
CPC ............. G06F 16/9535; G06F 16/5854; G06F 16/907; G06K 9/00657; G09B 19/00
(Continued)

(56) References Cited

U.S. PATENT DOCUMENTS 9,292,796 B1 3/2016 Mewes et al.
10,694,686 B2 * 6/2020 Xu ........................ H04L 43/045
(Continued)

FOREIGN PATENT DOCUMENTS

CN 202918424 U 5/2013
CN 104933699 A 9/2015
(Continued)

OTHER PUBLICATIONS

Tropical Marine Fisheries-Role of Central Marine Fisheries Research Institute in Research and Development: Achievements, Ongoing Activities and the Way Forward, Gopalakrishnan et al., (Year: 2014).*
(Continued)

*Primary Examiner* — Jean M Corrielus
(74) *Attorney, Agent, or Firm* — Elliot J. Shine

(57) ABSTRACT

A method, computer system, and computer program product for expanding phenological data resources by collecting phenological data from social media sites are provided. The embodiment may include determining one or more species of plants or animals from a plurality of data shared on social media sites. The embodiment may also include extracting phenological information related to the determined plants or animals. The embodiment may further include validating the phenological information against known or already validated information received from crowd source phenological information or a plurality of ecological and biological databases. The embodiment may further include cataloging the validated and filtered phenological information according to a list selected from a group consisting of species, locations, biological or ecological characteristics. The embodiment may also include generating reports related to the cataloged phenological information utilizing plant image analysis, object identification analysis or user satisfaction analysis.

8 Claims, 7 Drawing Sheets

(51) Int. Cl.
*G09B 19/00* (2006.01)
*G06F 16/907* (2019.01)
*G06F 16/583* (2019.01)
*G06V 20/10* (2022.01)

(58) Field of Classification Search
USPC .......................................................... 707/736
See application file for complete search history.

(56) References Cited

U.S. PATENT DOCUMENTS

| | | | | |
|---|---|---|---|---|
| 10,769,733 | B2* | 9/2020 | Xu | G06Q 50/02 |
| 10,779,476 | B2* | 9/2020 | McCall | G06V 10/82 |
| 2003/0030677 | A1* | 2/2003 | Hirneisen | G09B 23/38 |
| | | | | 715/810 |
| 2004/0168216 | A1* | 8/2004 | Carman | A01H 1/04 |
| | | | | 800/287 |
| 2007/0204800 | A1* | 9/2007 | O'Neil | A01K 29/00 |
| | | | | 119/428 |
| 2012/0215458 | A1* | 8/2012 | Marcotte | G16B 20/00 |
| | | | | 703/2 |
| 2013/0275894 | A1* | 10/2013 | Bell | G06F 3/0481 |
| | | | | 715/764 |
| 2014/0188573 | A1 | 7/2014 | Avey et al. | |
| 2014/0358486 | A1* | 12/2014 | Osborne | G01N 33/0098 |
| | | | | 702/189 |
| 2015/0089870 | A1* | 4/2015 | Golenberg | C12N 15/8218 |
| | | | | 504/196 |
| 2016/0110524 | A1* | 4/2016 | Short | G06F 16/9535 |
| | | | | 705/2 |
| 2017/0042097 | A1 | 2/2017 | Persad | |
| 2017/0250751 | A1 | 8/2017 | Kargieman et al. | |
| 2018/0012167 | A1 | 1/2018 | Colin et al. | |
| 2018/0012463 | A1* | 1/2018 | Chaudhry | H04N 7/18 |
| 2019/0050741 | A1* | 2/2019 | Mewes | G06N 20/00 |
| 2019/0082223 | A1* | 3/2019 | David | H04N 21/222 |
| 2019/0250882 | A1* | 8/2019 | Swansey | G06F 40/289 |
| 2019/0387735 | A1* | 12/2019 | Wynn | A01M 31/002 |
| 2020/0253127 | A1* | 8/2020 | McCall | G06V 10/454 |

FOREIGN PATENT DOCUMENTS

| | | | |
|---|---|---|---|
| CN | 104951754 A | 9/2015 | |
| CN | 205014981 U | 2/2016 | |
| EP | 3009975 A1 | 4/2016 | |
| WO | 2015161324 A1 | 10/2015 | |
| WO | 2016189468 A1 | 12/2016 | |
| WO | WO-2020021319 A1 * | 1/2020 | ............. G06T 17/00 |

OTHER PUBLICATIONS

A Computational—and Storage-Cloud for Integration of Biodiversity Collections, Matsunaga et al., (Year: 2013).*
A National Human Neuroimaging Collaboratory Enabled by the Biomedical Informatics Research Network (BIRN), Keator et al., (Year: 2008).*
Mass digitization of scientific collections: New opportunities to transform the use of biological specimens and underwrite biodiversity Science, Beaman et al., (Year: 2012).*
Smartphone-Based Distributed Data Collection Enables Rapid Assessment of Shorebird Habitat Suitability, Thieler et al., (Year: 2016).*
The SinBiota 2.0 Biodiversity Information System, Mira et al., (Year: 2011).*
Mell, et al., "The NIST Definition of Cloud Computing," National Institute of Standards and Technology, U.S. Department of Commerce, Special Publication 800-145, Sep. 2011, pp. 1-7.
Sakamoto et al., "A crop phenology detection method using time-series MODIS data", Remote Sensing of Environment 96 (2005), pp. 366-374.
Garden Answers, LLC, "Garden Answers Plant Id", App Store, https://itunes.apple.com/us/app/garden-answers-plant-identification/id60, accessed Jun. 1, 2018, 3 pages.
Rosemartin et al., "Organizing phenological data resources to inform natural resource conservation", Biological Conservation 173 (2014), pp. 90-97, Published by Elsevier Ltd.
Dierenbach et al., "The plant phonological online database (PPODB): an online database for long-term phenological data", Int J Biometeorol (2013) 57, pp. 805-812.
Wikipedia, "Phenology", https://en.wikipedia.org/wiki/Phenology, accessed Jun. 1, 2018, 7 pages.
USA National Phenology Network, "Why Phenology?", https://www.usanpn.org/about/why-phenology, accessed Jun. 1, 2018, 1 page.
Snaptrends, "Social Media Map—Location-based Insights", http://snaptrends.com/social-media-software/map/, accessed Jun. 1, 2018, 5 pages.
Trendhunter, "Social Media Mapping—Social networks look to map the world via data collected on users", https://www.trendhunter.com/protrends/social-media-mapping, accessed Jun. 1, 2018, 6 pages.
Wikipedia, "Google Flu Trends", https://en.wikipedia.org/wiki/Google_Flu_Trends, accessed Jun. 1, 2018, 5 pages.
Justvisiual Inc., "LikeThat Garden—Flower Identification", http://www.farms.com/agriculture-apps/gardening/like-that-garden-flower-identification, accessed on Jun. 11, 2018, 3 pages.
Buchele, "In the Growing Battle Against Invasive Plants, Texas Lags Behind Other States", http://www.kut.org/post/growing-battle-against-invasive-plants-texas-lags-behind-other-states, Oct. 26, 2016, 7 pages.
Texas Invasive Plaint and Pest Council, "Texas Invasives", https://www.texasinvasives.org/plant_database/tda_results.php, accessed on Jun. 1, 2018, 2 pages.

* cited by examiner

AUTODIDACTIC PHENOLOGICAL DATA COLLECTION AND VERIFICATION

BACKGROUND

The present invention relates, generally, to the field of computing, and more particularly to phenological data.

Phenology may relate to the study of plant and animal life cycle stages in relation to weather and climate. For example, phenology studies how certain seasonal events, such as leafing and flowering, migration of birds may be influenced by weather and climate. It is widely believed that changes in the timing of plant and animal phenology are one of the most sensitive indicators of the global climate change, and scientists, naturalists, farmers, gardeners, fishermen and many others have been recording their observations of seasonal phenology changes for very long time. Generally, phenological records are collected by observation stations and volunteers. For example, the Plant Phenological Online Database (PPODB) collected 16 million phenological observations from over 8,00 stations in Central Europe between the years 1880 and 2009.

SUMMARY

According to one embodiment, a method, computer system, and computer program product for expanding phenological data resources by collecting phenological data from social media sites are provided. The embodiment may include determining one or more species of plants or animals from a plurality of data shared on social media sites. The embodiment may also include extracting phenological information related to the determined plants or animals. The embodiment may further include validating the phenological information against known or already validated information received from crowd source phenological information or a plurality of ecological and biological databases. The embodiment may further include cataloging the validated and filtered phenological information according to a list selected from a group consisting of species, locations, biological or ecological characteristics. The embodiment may also include generating reports related to the cataloged phenological information utilizing plant image analysis, object identification analysis or user satisfaction analysis. The embodiment may further include providing the cataloged phenological information and the generated reports to a user.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
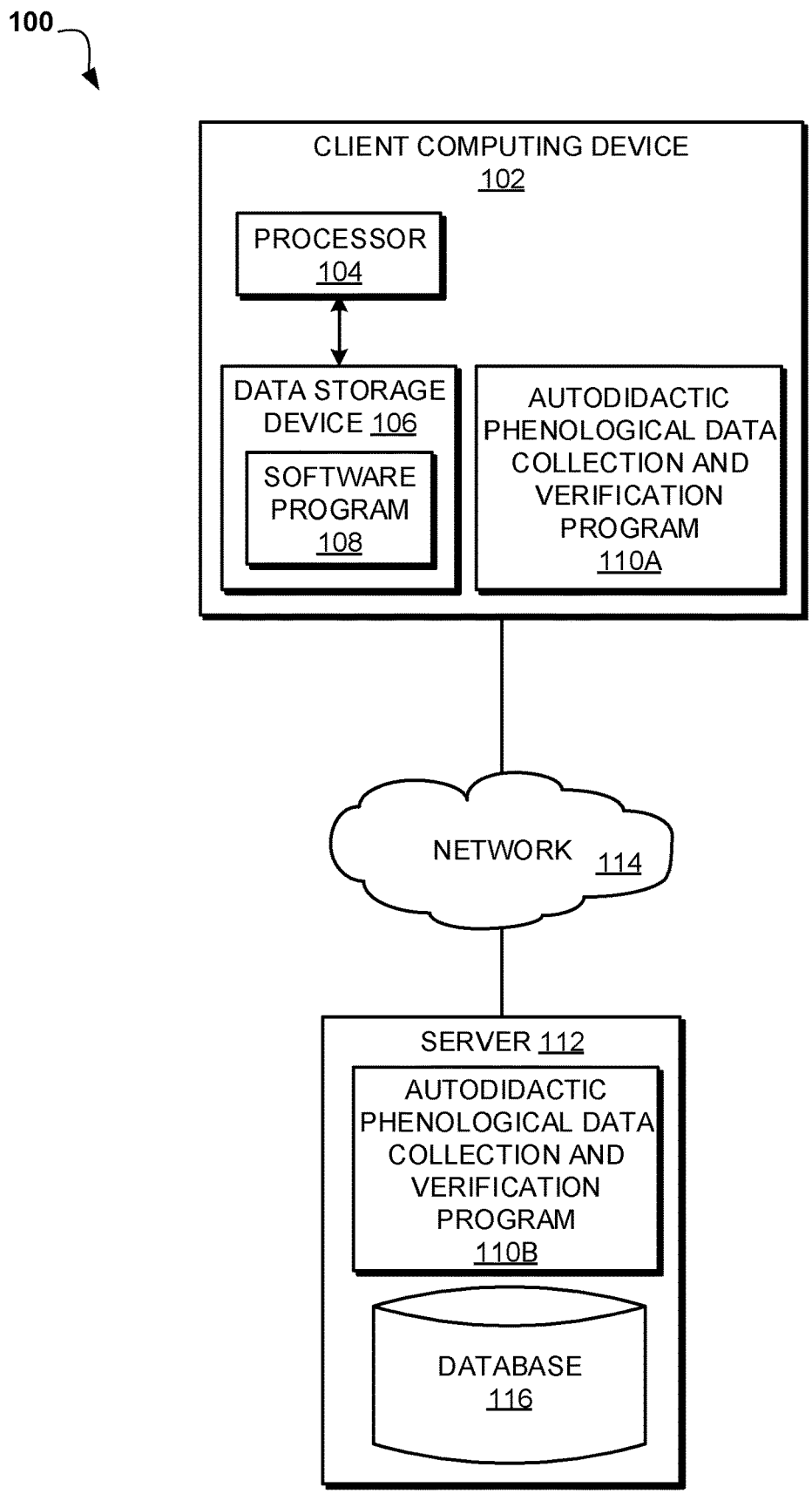
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to phenological data collection and verification systems. The following described exemplary embodiments provide a system, method, and program product to, among other things, allow a user to expand data collection resources and improve the quality of phenological and weather data by utilizing data extracted from various photographs on social media sites, which may be validated against known phenological information. Therefore, the present embodiment has the capacity to improve the technical field of phenological data collection and verification systems by efficiently allowing users to access huge phenological resources on social media sites at little or no cost as people are sharing billions of photos per day. Moreover, the present embodiment may allow phenological data systems to self-improve by adopting real-time feedback for revalidating and purifying saved phenological data which may include data extracted data from existing observation systems.

As previously described, phenology may relate to the study of plant and animal life cycle stages in relation to weather and climate. For example, phenology studies how certain seasonal events, such as leafing and flowering, migration of birds may be influenced by weather and climate. It is widely believed that changes in the timing of plant and animal phenology are one of the most sensitive indicators of the global climate change, and scientists, naturalists, farmers, gardeners, fishermen and many others have been recording their observations of seasonal phenology changes for very long time. Generally, phenological records are collected by observation stations and volunteers.

However, there are some challenges in phenological study. As phenological data are time and local sensitive, collecting phenological data from different natural locations, vegetation zones, and ecosystems every day is imperative. Although many phenology-related organizations, such as the National Phenology Network (NPN), are currently trying to set up phenological data observations and collection network in various regions, it is expensive to cover all locations, zones, and areas. Furthermore, consistency of phenological records is one of the most important factors in weather data analytics, but it is difficult to implement a consistent methodology to observe the same species in the same location at the same time based on the current manual observations. Also, accurately verifying collected data from a certain phenological observation station requires multiple samples and independent resources. Reliability of statistical analyses for phenological data verification increases as more phenological samples are collected. More importantly, the current phenological data collection systems require a relatively high cost for labor, equipment purchase, and maintenance. As such, it may be advantageous to, among other things, implement a system capable of collecting and verifying phenological data utilizing huge free resources of photographs shared among people everyday on social media sites.

According to one embodiment, an autodidactic phenological data collection and verification program may determine and extract desired phenological objects and information about plant lifecycle stages from unstructured information available on social media sites, such as shared image, text, audio and video for normalization and validation processes. The normalized and validated information then may be cataloged according to lists of species, location or biological characteristics and merged into a phenology repository. In at least one other embodiment, an autodidactic phenological data collection and verification program may self-improve by revalidating and purifying the saved data based on real-time feedback received from users of a phenological data retrieval service.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to autodidactically collect and verify phenological data available on social media sites.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an autodidactic phenological data collection and verification program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running an autodidactic phenological data collection and verification program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the autodidactic phenological data collection and verification program 110A, 110B may be a program capable of determining phenological objects from unstructured data, such as image, videos, descriptions, comments, metadata and tags and extracting desired phenological objects and related information, such as time, date, location, and weather condition. Once those objects and related information are determined and extracted, the autodidactic phenological data collection and verification program 110A, 110B may normalize and validate the phenological information and filter the normalized information and edited, unreasonable, and illogical data utilizing plants image analysis or object identification analysis. For example, the autodidactic phenological data collection and verification program 110A, 110B may filter out a picture of a palm tree with flowers uploaded from Alaska or edited image of egg plants with rose flowers. Furthermore, the autodidactic phenological data collection and verification program 110A, 110B may catalog the phenological information and update or save the phenological information into a phenology repository. The autodidactic phenological data collection and verification process is explained in further detail below with respect to FIGS. 2A and 2B.

Figure 2A:
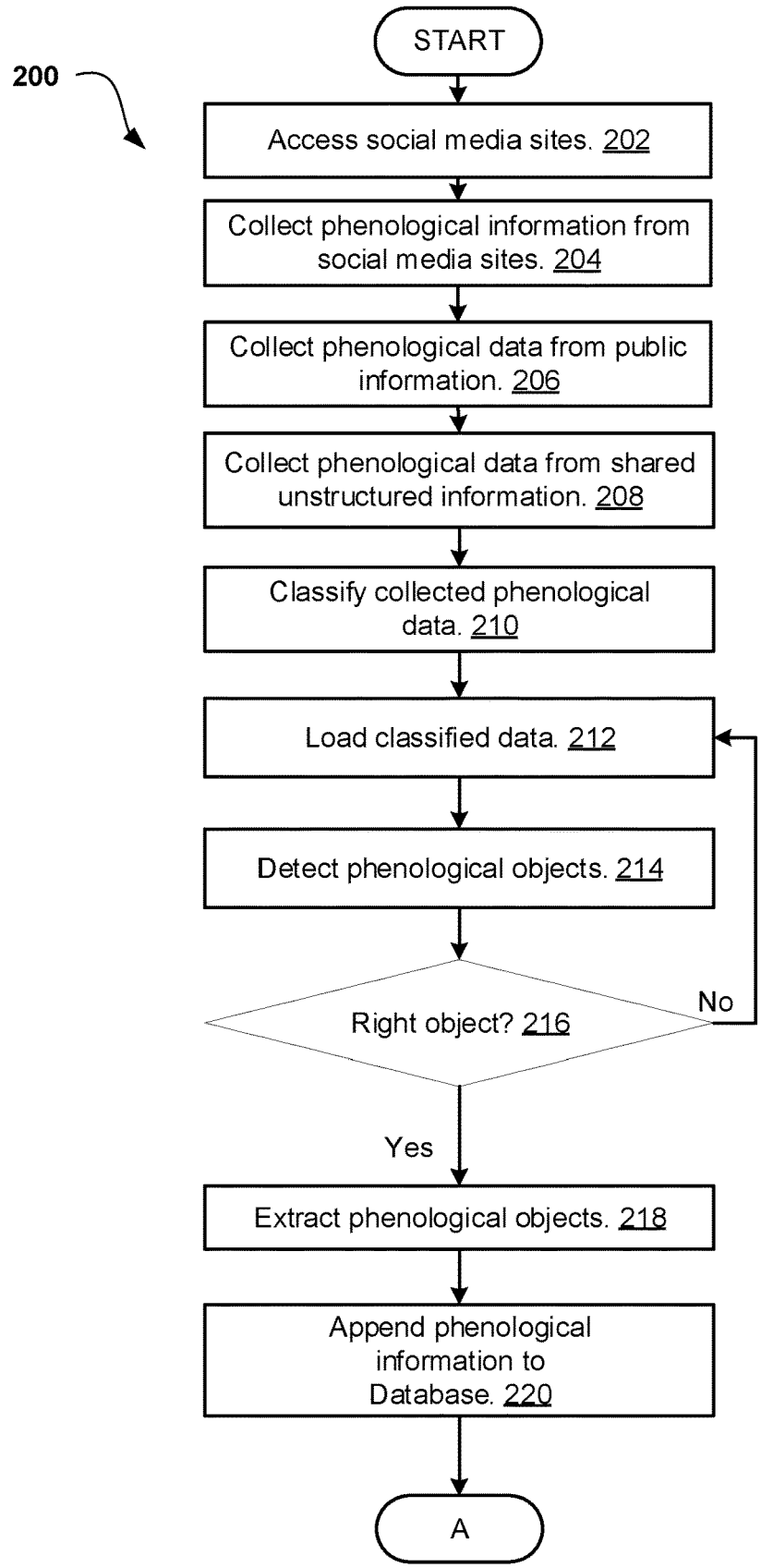
FIG. 2A-2B are operational flowcharts illustrating an autodidactic phenological data collection and verification process according to at least one embodiment.
Figure 2B:
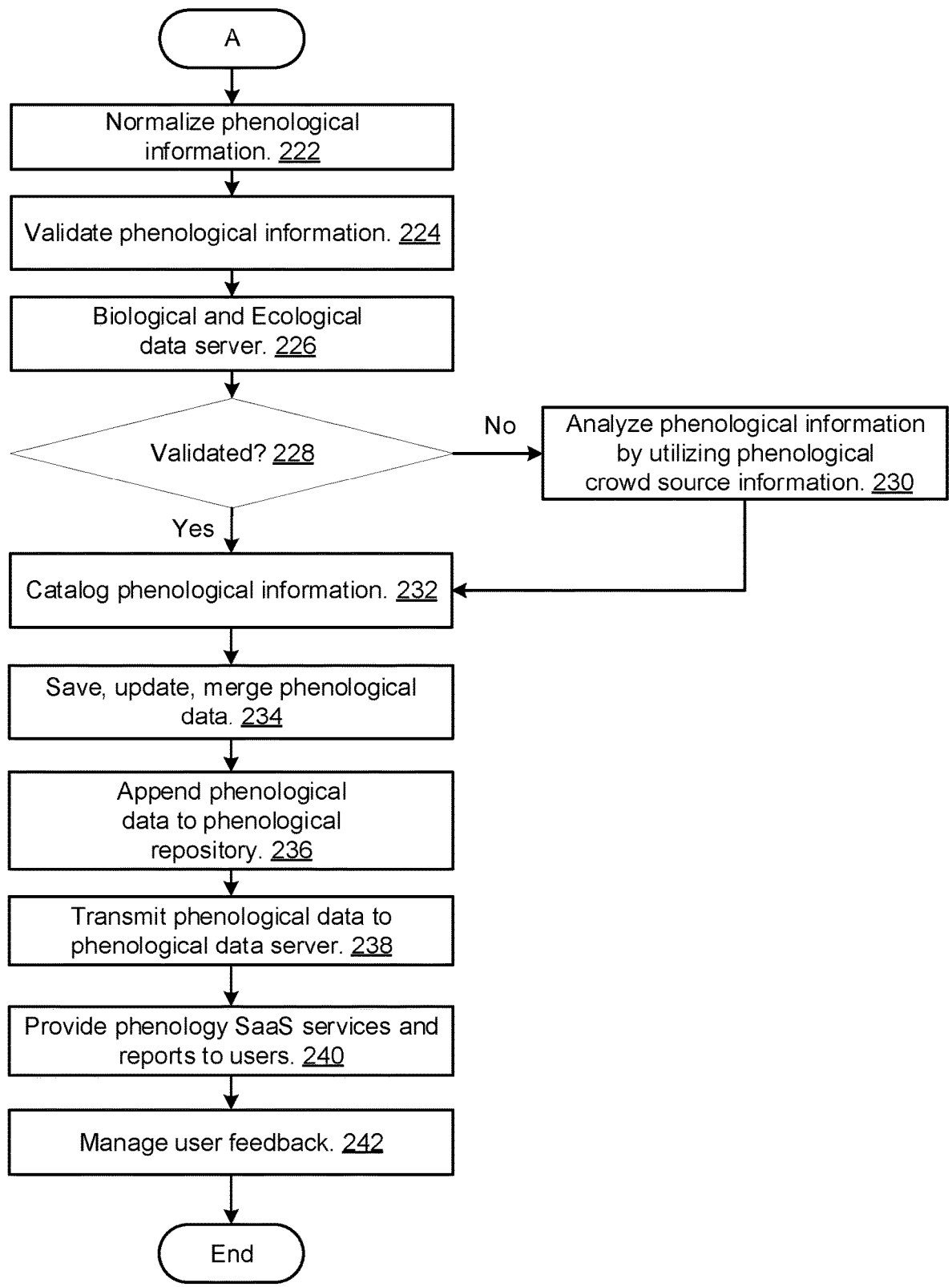

FIGS. 2A and 2B depict an operational flowchart illustrating an autodidactic phenological data collection and verification process 200 according to at least one embodiment. At 202, the autodidactic phenological data collection and verification program 110A, 110B accesses various social media sites. For example, the autodidactic phenological data collection and verification program 110A, 110B may access a plurality of pages on social media sites, simultaneously, and detect pictures, audio, video or text information related to candidate phenological objects, such as pictures of flowers or butterflies, a video depicting a robin building its nest or leaves turning colors as the seasons change. According to at least one other embodiment, the autodidactic phenological data collection and verification program 110A, 110B may access image, video, audio and text files stored on a user device even before a user uploads the same files to a social media site.

At 204, the autodidactic phenological data collection and verification program 110A, 110B collects phenological information from social media sites. For example, the autodidactic phenological data collection and verification program 110A, 110B may collect a plurality of pictures or video files from the social media sites that the autodidactic phenological data collection and verification program 110A, 110B accessed in step 202. For example, the autodidactic phenological data collection and verification program 110A, 110B may collect pictures of seasonal flowers, tree leaves turning yellow, or bumblebees carrying pollen.

At 206, the autodidactic phenological data collection and verification program 110A, 110B collects phenological data from public information. According to one embodiment, the autodidactic phenological data collection and verification program 110A, 110B may access non-social media sites or web pages to collect more general phenological information publicly available. For example, the autodidactic phenological data collection and verification program 110A, 110B may collect general information as to when bumblebees actively carry pollen in the spring in specific areas, such as Central Park, New York or Fishkill, N.Y. Also, the autodidactic phenological data collection and verification program 110A, 110B may access the publicly available websites and collect information as to the season-specific plants or animal activities that have been observed for a long time. For example, the autodidactic phenological data collection and verification program 110A, 110B may collect information as to when or where specific birds migrate as the seasons change from government organization webpages, such as a Department of Environmental Conservation website.

At 208, the autodidactic phenological data collection and verification program 110A, 110B collects phenological data from shared unstructured information. Shared unstructured information may include video, text, audio or image files. The autodidactic phenological data collection and verification program 110A, 110B may search and collect shared pictures or video or text files that do not have a pre-defined data model or are not organized in a pre-defined manner. For example, people may share pictures of themselves or pictures depicting certain famous landmarks without knowing the pictures they have taken accidentally depict butterflies or other insects' seasonal activities. These kinds of pictures may not be searchable using traditional search words or analyzing the hashtags associated with them. The autodidactic phenological data collection and verification program 110A, 110B may analyze such unstructured data and only collect phenological information, such as bumblebees or butterflies flying in the background of the pictures or sound of certain birds tweeting in the background of video files.

At 210, the autodidactic phenological data collection and verification program 110A, 110B classifies collected phenological data. According to one embodiment, the autodidactic phenological data collection and verification program 110A, 110B may classify collected phenological data into particular groups, such as animals, insects, non-animals, and plants, based on various time and locations. For example, the autodidactic phenological data collection and verification program 110A, 110B may classify a picture of tree leaves turning yellow taken in March or April into a group labeled as "plant, color change, Spring". Likewise, the autodidactic phenological data collection and verification program 110A, 110B may classify a video file depicting birds migrating from north to south in the winter into a group labeled as "animals, migration, winter".

At 212, the autodidactic phenological data collection and verification program 110A, 110B loads classified data. For example, the autodidactic phenological data collection and verification program 110A, 110B may load the data classified into a group labeled as "plant, color change, Spring" and "animals, migration, winter". Within each group, the autodidactic phenological data collection and verification program 110A, 110B may load image, text, video and audio files. According to at least one embodiment, the autodidactic phenological data collection, and verification program 110A, 110B may load classified data in a manner that the classified data is further classified into sub-categories, such as "video files of geese migrating south in November 2012".

At 214, the autodidactic phenological data collection and verification program 110A, 110B detects phenological objects from the classified data. For example, the autodidactic phenological data collection and verification program 110A, 110B may detect a bird (e.g. goose, robin, crane, etc.) or an insect, such as particular types of butterflies or bees using known image recognition technologies.

At 216, the autodidactic phenological data collection and verification program 110A, 110B determines whether the detected phonological object is the right object. According to one embodiment, the autodidactic phenological data collection and verification program 110A, 110B may utilize the pre-configured list of correct objects or algorithms to determine whether a candidate object is a right object. If the autodidactic phenological data collection and verification program 110A, 110B determines that a particularly depicted object is the right phenological object (step 216, "Yes" branch), the autodidactic phenological data collection and verification process 200 may continue to step 218 to extract phenological objects. If the autodidactic phenological data collection and verification program 110A, 110B does not determine that a particular type of tree is not the right phenological object (step 216, "No" branch), the autodidactic phenological data collection and verification process 200 may return to step 212 to load new classified data.

At 218, the autodidactic phenological data collection and verification program 110A, 110B extract phenological objects. For example, the autodidactic phenological data collection and verification program 110A, 110B may extract a particular type of butterfly (e.g. Common Wood-Nymph) as a phenological object from a plurality of photographs depicting a plurality of butterflies shared on social media sites utilizing known image extraction technologies.

At 220, the autodidactic phenological data collection and verification program 110A, 110B appends phenological information to a database. The phenological information may include specie names, weather condition, time, date and location at which the objects were captured and depicted. For example, the autodidactic phenological data collection and verification program 110A, 110B may append the collected information about a Common Wood Nymph butterfly, such as the number of the butterflies appearing in a particular area at specific times or on dates to a database. According to one embodiment, the autodidactic phenological data collection, and verification program 110A, 110B may append phenological information to a plurality of databases based on the classification or subcategories into which each phenological information fit.

Referring now to FIG. 2B, at 222, the autodidactic phenological data collection and verification program 110A, 110B normalizes phenological information in order to reduce data redundancy and improve data integrity. According to one embodiment, the autodidactic phenological data collection and verification program 110A, 110B may organize the collected phenological information into two or more tables and define the relationship between the tables. For example, the autodidactic phenological data collection and verification program 110A, 110B may extract two different kinds of butterflies with the same seasonal behaviors and place them in the same column within a table. Further, the autodidactic phenological data collection and verification program 110A, 110B may place data as to certain butterfly activities occurring around 1 pm and 3 pm in the same column labeled, such as "butterfly activity in the afternoon" within a table.

At 224, the autodidactic phenological data collection and verification program 110A, 110B validates phenological information against information received from a biological and ecological data server 226. For example, the autodidactic phenological data collection and verification program 110A, 110B may extract a phenological object such as a Common Wood Nymph butterfly from a shared photograph on a social media site, collect data as to the date and the time of certain activities (e.g. laying eggs, transforming from a caterpillar to a larva, etc.), and validate the information against the information received from a biological and ecological data server 226 (e.g. typical location and timing of laying eggs, transformation and metamorphosis, etc.).

At 226, the autodidactic phenological data collection and verification program 110A, 110B receives valid biological and ecological information from a biological and ecological data repository. For example, the autodidactic phenological data collection and verification program 110A, 110B may receive from the server certain biological and ecological information as to a Common Wood Nymph butterfly, such as biological description of the species (e.g. color, size of the body, etc.) and ecological description (e.g. when eggs are laid, description of habitats).

At 228, the autodidactic phenological data collection and verification program 110A, 110B determines whether the phonological information is validated or not. If the autodidactic phenological data collection and verification program 110A, 110B determines that particular information is valid (step 216, "Yes" branch), the autodidactic phenological data collection and verification program 110A, 110B may continue to step 232 to catalog the phenological information. If the autodidactic phenological data collection and verification program 110A, 110B does not determine that particular phenological information is valid (step 228, "No" branch), the autodidactic phenological data collection and verification program 110A, 110B may continue to step 230 to analyze crowd source phenological information.

At 230, the autodidactic phenological data collection and verification program 110A, 110B analyzes crowd source phenological information. According to one embodiment, the autodidactic phenological data collection and verification program 110A, 110B may re-analyze the phenological information, which has not been validated against the information received from a biological and ecological data server, utilizing additional information obtained from a phenological crowd source. For example, certain information as to a Common Wood Nymph butterfly received from a biological and ecological data server may not be enough to validate certain activity of said butterfly. According to one embodiment, the autodidactic phenological data collection and verification program 110A, 110B may search and receive more detailed information as to habitats, distribution, ecological information as to the same butterfly and re-evaluate the original information and validate it.

At 232, the autodidactic phenological data collection and verification program 110A, 110B catalogs phenological information. According to one embodiment, the autodidactic phenological data collection and verification program 110A, 110B may catalog phenological information according to lists of species, locations, biological or ecological characteristics. For example, the autodidactic phenological data collection and verification program 110A, 110B may catalog information as to a Common Wood Nymph butterfly according to the species name and location where it was found or photographed, and biological characteristics, such as the color or size of the body.

At 234, the autodidactic phenological data collection and verification program 110A, 110B saves, updates and merges phenological data. According to one embodiment, the autodidactic phenological data collection and verification program 110A, 110B may update or merge the previously saved phenological data of the phenological object with the newly extracted and cataloged phenological data of the same object. For example, if the previously saved phenological data indicates that a robin began building a nest in early March in Boston, and the autodidactic phenological data collection and verification program 110A, 110B recently extracted information that a robin began building a nest in the last week of February in Boston, the autodidactic phenological data collection and verification program 110A, 110B may update and save the new information.

At 236, the autodidactic phenological data collection and verification program 110A, 110B appends phenological data to a phenological repository. For example, the autodidactic phenological data collection and verification program 110A, 110B may append the most recently updated phenological information as to a robin or a butterfly such as biological characteristics, ecological characteristics (e.g. timing of nesting, laying eggs, migration, etc.), location and time when the objects were observed or photographed. According to one embodiment, the autodidactic phenological data collection and verification program 110A, 110B may append a plurality of phenological information to a plurality of repositories simultaneously or almost simultaneously.

At 238, the autodidactic phenological data collection and verification program 110A, 110B transmits phenological data to a phenological data server. According to one embodiment, the autodidactic phenological data collection, and verification program 110A, 110B may transmit the most recently updated phenological data saved in the repository to a plurality of phenological data server simultaneously or almost simultaneously.

At 240, the autodidactic phenological data collection and verification program 110A, 110B provides phenology SaaS service to users. According to one embodiment, the autodidactic phenological data collection and verification program 110A, 110B may generate reports related to the cataloged information utilizing advanced analytics, such as plant image analysis, object identification analysis or user satisfaction analysis and provide users with phenological data retrieval services and the generated reports. For example, a user interested in the phenological study may connect to the above described phenological data server and may request retrieval of certain information. In at least one other embodiment, the autodidactic phenological data collection and verification program 110A, 110B may provide both historical and real-time SaaS services.

At 242, the autodidactic phenological data collection and verification program 110A, 110B manages user feedback. For example, a user who retrieved certain phenological information from a phenological data server via a SaaS service may already have owned slightly different information as to the same phenological object. In such cases, a user may provide feedback on the information that is contradictory to the user's own information. The autodidactic phenological data collection and verification program 110A, 110B may then receive the feedback from the user, analyze and update the original information, if necessary.

Figure 3:
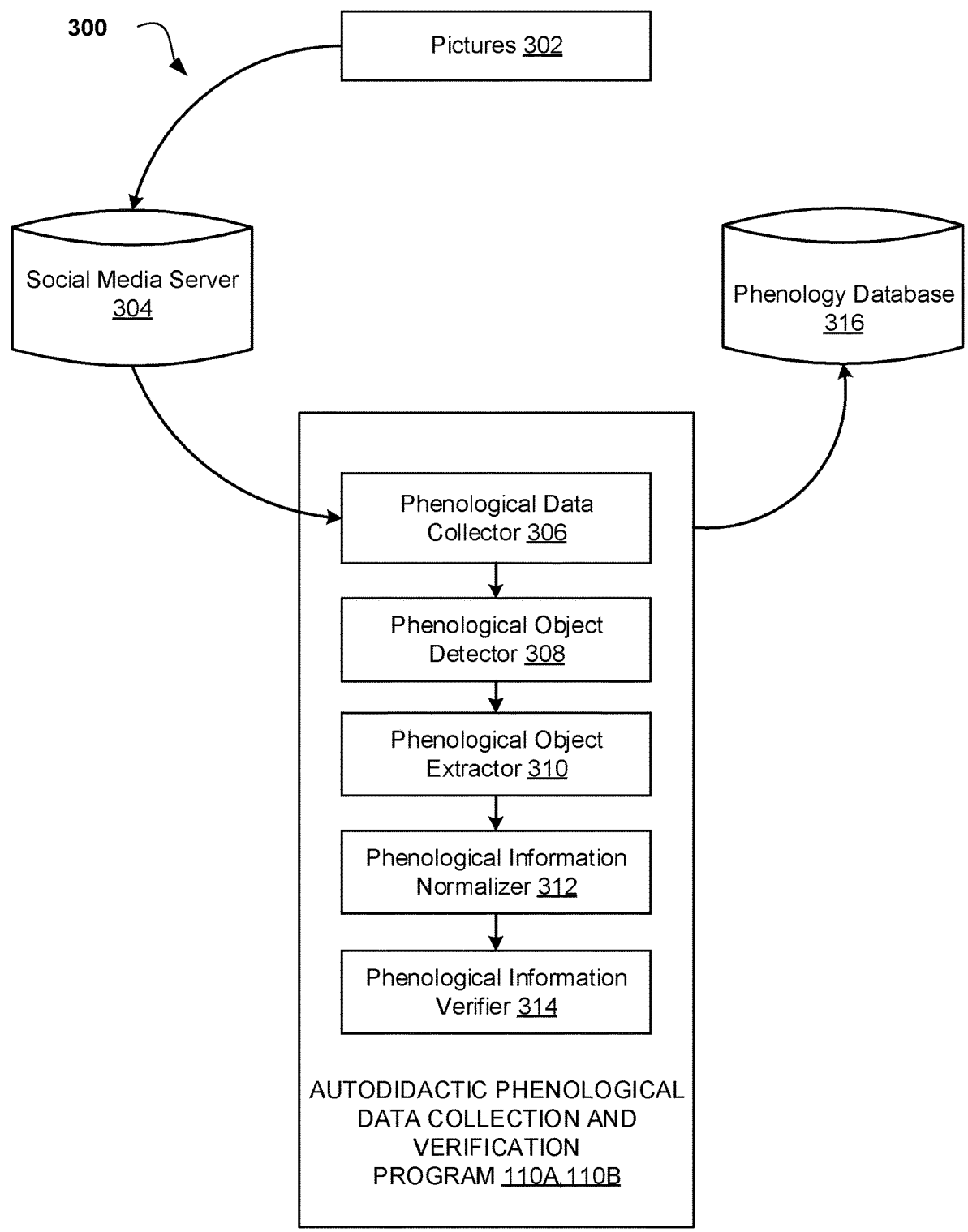
FIG. 3 is a functional block diagram of an autodidactic phenological data collection and verification platform according to at least one embodiment.

Referring now to FIG. 3, a functional block diagram of an autodidactic phenological data collection and verification platform 300 is depicted according to at least one embodiment. When a user uploads pictures 302 to a social media server 304, the autodidactic phenological data collection and verification program 110A, 110B may include the phenological data collector 306, the phenological object detector 308, the phenological object extractor 310, the phenological information normalizer 312, and the phenological information verifier 314. The phenological data collector 306 may receive pictures from a social media server 304 and the phenological object detector 308 may detect phenological objects, such as butterflies or certain birds. The phenological object extractor 310 then may extract phenological objects so that the phenological information normalizer 312 may normalize the extracted phenological objects and the biological and ecological data associated with the phenological objects. The phenological information verifier 314 then may verify the normalized phenological information. The autodidactic phenological data collection and verification program 110A, 110B may transmit the verified phenological information to a phenology database 316.

It may be appreciated that FIGS. 2-3 provide only an illustration of one implementation and do not imply any limitations with regard to how different embodiments may be implemented. Many modifications to the depicted environments may be made based on design and implementation requirements. For example, steps or sub-steps may be performed concurrently to other steps or sub-steps.

Additionally, in at least one embodiment, the autodidactic phenological data collection and verification program 110A, 110B may receive and detect phenological objects from unstructured data stored on user devices. Also, in at least one other embodiment, the autodidactic phenological data collection, and verification program 110A, 110B may self-improve the phenological data saved in a repository by incorporating real-time feedback, such as comments from the past or new information which a user may manually provide to the autodidactic phenological data collection and verification program 110A, 110B. Furthermore, the autodidactic phenological data collection and verification program 110A, 110B may be implemented to collect and verify information specifically related to invasive plants that overwhelm ecosystems, for example, by sucking water from reservoirs and displacing native forests and grasslands.

Figure 4:
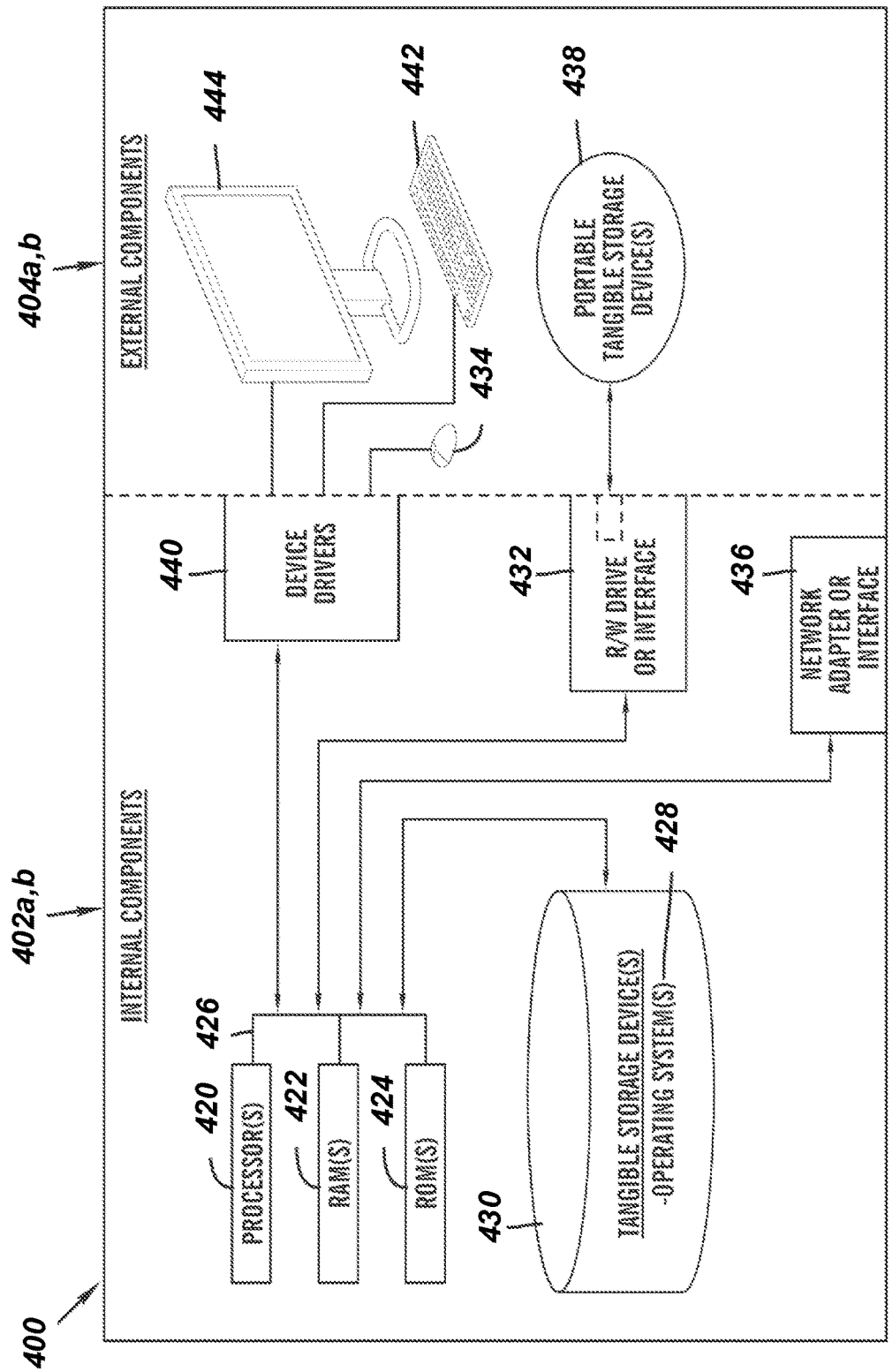
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the autodidactic phenological data collection and verification program 110A in the client computing device 102 and the autodidactic phenological data collection and verification program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes an R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the autodidactic phenological data collection and verification program 110A, 110B, can be stored on one or more of the respective portable computer-readable tangible storage devices 438, read via the respective R/W drive or interface 432 and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the autodidactic phenological data collection and verification program 110A in the client computing device 102 and the autodidactic phenological data collection and verification program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the autodidactic phenological data collection and verification program 110A in the client computing device 102 and the autodidactic phenological data collection and verification program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 5:
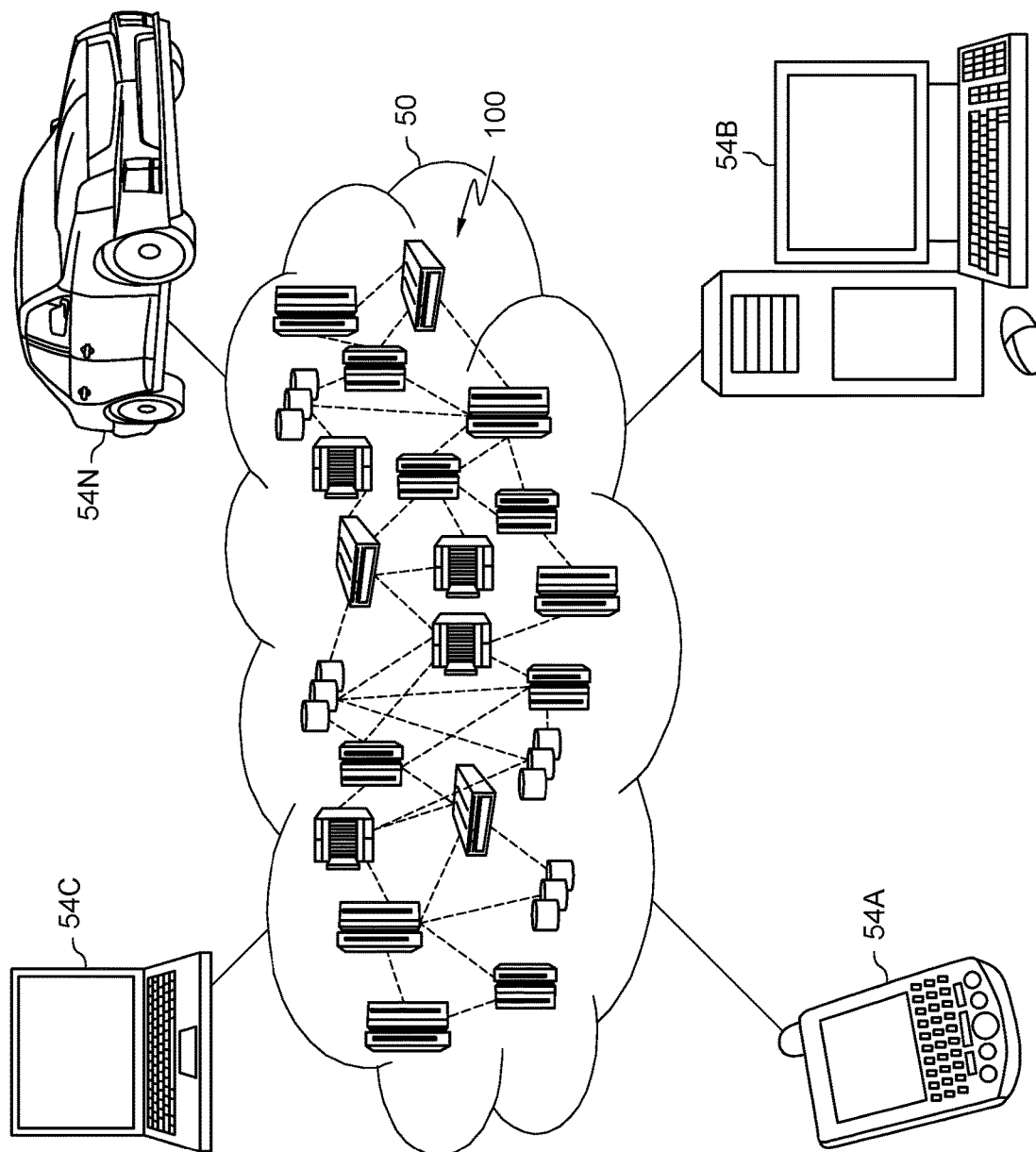
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
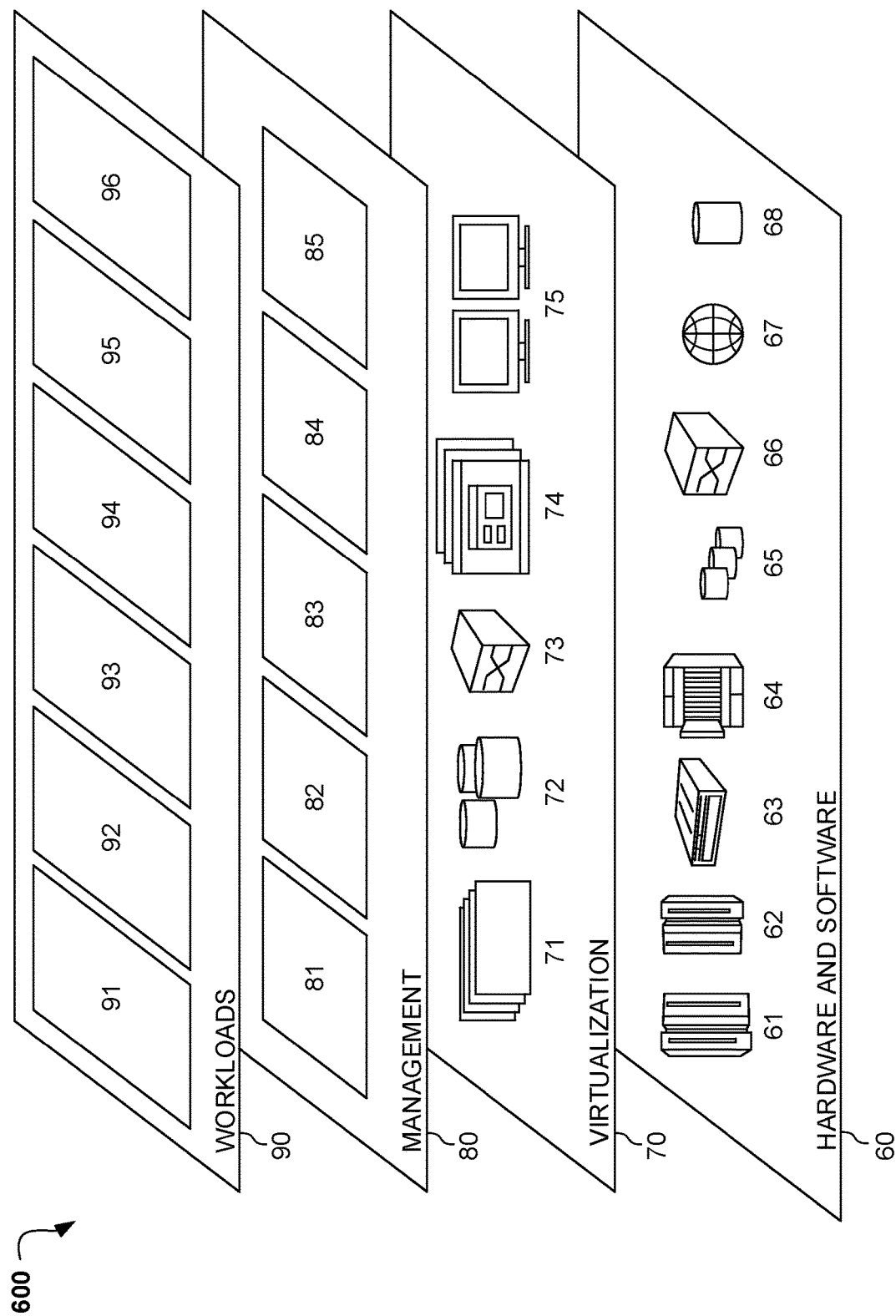
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and phenological data collection and verification 96. Phenological data collection and verification 96 may relate to generating a database of phenological objects extracted from various data shared on social media sites and verified phenological data associated with the extracted phenological objects and monitoring various databases or servers where publicly available ecological and biological data may be found for verification of the originally collected phenological data.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A processor-implemented method for expanding phenological data resources by collecting phenological data from social media sites, the method comprising:
  determining, by a processor, one or more species of plants or animals from a plurality of data shared on one or more social media sites, wherein the plurality of data is unstructured data;
  extracting phenological information related to the determined plants or animals from the plurality of data shared on the one or more social media sites, wherein the plurality of data includes one or more of images, videos, audio files, written descriptions, comments, metadata, or tags, and wherein the extracted phenological information comprises information relating to time, date, location, or related weather conditions;
  validating the phenological information against known or already validated information received from crowd source phenological information or a plurality of ecological and biological databases, wherein in response to validating the phenological information, simultaneously, filtering out edited, relatively unreasonable or illogical information compared to the already known or public information utilizing plant image analysis or object identification analysis;
  cataloging the validated and filtered phenological information in a phenological repository, wherein the phenological repository is updated in real time, and wherein the phenological information is cataloged according to a list selected from a group consisting of species, locations, biological or ecological characteristics;
  generating reports related to the cataloged phenological information utilizing plant image analysis, object identification analysis or user satisfaction analysis;
  providing the cataloged phenological information and the generated reports to one or more users;
  receiving feedback from at least one of the one or more users based on the retrieved phenological information;
  revalidating and updating the phenological information cataloged in the phenological repository; and
  transmitting the updated phenological information cataloged in the phenological repository to the one or more users.

2. The method of claim 1, wherein the phenological information comprises information specifically related to invasive species that endanger the ecosystem.

3. The method of claim 1, further comprising:
  determining one or more species of plants or animals from a plurality of data stored on user devices.

4. A computer system for expanding phenological data resources by collecting phenological data from social media sites, the computer system comprising:
  one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
  determining, by a processor, one or more species of plants or animals from a plurality of data shared on one or more social media sites, wherein the plurality of data is unstructured data;
  extracting phenological information related to the determined plants or animals from the plurality of data shared on the one or more social media sites, wherein the plurality of data includes one or more of images, videos, audio files, written descriptions, comments, metadata, or tags, and wherein the extracted phenological information comprises information relating to time, date, location, or related weather conditions;
  validating the phenological information against known or already validated information received from crowd source phenological information or a plurality of ecological and biological databases, wherein in response to validating the phenological information, simultaneously, filtering out edited, relatively unreasonable or illogical information compared to the already known or public information utilizing plant image analysis or object identification analysis;
  cataloging the validated and filtered phenological information in a phenological repository, wherein the phenological repository is updated in real time, and wherein the phenological information is cataloged according to a list selected from a group consisting of species, locations, biological or ecological characteristics;
  generating reports related to the cataloged phenological information utilizing plant image analysis, object identification analysis or user satisfaction analysis;

providing the cataloged phenological information and the generated reports to one or more users;

receiving feedback from at least one of the one or more users based on the retrieved phenological information;

revalidating and updating the phenological information cataloged in the phenological repository; and transmitting the updated phenological information cataloged in the phenological repository to the one or more users.

5. The computer system of claim 4, wherein the phenological information comprises information specifically related to invasive species that endanger the ecosystem.

6. The computer system of claim 4, further comprising: determining one or more species of plants or animals from a plurality of data stored on user devices.

7. A computer program product for expanding phenological data resources by collecting phenological data from social media sites, the computer program product comprising:

one or more computer-readable non-transitory tangible storage medium and program instructions stored on at least one of the one or more tangible storage medium, the program instructions executable by a processor, the program instructions comprising:

determining, by a processor, one or more species of plants or animals from a plurality of data shared on one or more social media sites, wherein the plurality of data is unstructured data;

extracting phenological information related to the determined plants or animals from the plurality of data shared on the one or more social media sites, wherein the plurality of data includes one or more of images, videos, audio files, written descriptions, comments, metadata, or tags, and wherein the extracted phenological information comprises information relating to time, date, location, or related weather conditions;

validating the phenological information against known or already validated information received from crowd source phenological information or a plurality of ecological and biological databases, wherein in response to validating the phenological information, simultaneously, filtering out edited, relatively unreasonable or illogical information compared to the already known or public information utilizing plant image analysis or object identification analysis;

cataloging the validated and filtered phenological information in a phenological repository, wherein the phenological repository is updated in real time, and wherein the phenological information is cataloged according to a list selected from a group consisting of species, locations, biological or ecological characteristics;

generating reports related to the cataloged phenological information utilizing plant image analysis, object identification analysis or user satisfaction analysis;

providing the cataloged phenological information and the generated reports to one or more users;

receiving feedback from at least one of the one or more users based on the retrieved phenological information;

revalidating and updating the phenological information cataloged in the phenological repository; and transmitting the updated phenological information cataloged in the phenological repository to the one or more users.

8. The computer program product of claim 7, wherein the phenological information comprises information specifically related to invasive species that endanger the ecosystem.

* * * * *